Dec. 22, 1925. Re. 16,233

F. A. STEVENS

OPHTHALMIC MOUNTING

Original Filed Dec. 3, 1918 2 Sheets-Sheet 1

Inventor
Frederick A. Stevens
by David Rines
Attorney

Dec. 22, 1925. Re. 16,233

F. A. STEVENS

OPHTHALMIC MOUNTING

Original Filed Dec. 3, 1918 2 Sheets-Sheet 2

Inventor
Frederick A. Stevens
by David Rines
attorney

Reissued Dec. 22, 1925.

Re. 16,233

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Original No. 1,308,964, dated July 8, 1919, Serial No. 265,138, filed December 3, 1918. Application for reissue filed September 19, 1925. Serial No. 57,477.

*To all whom it may concern:*

Be it known that I, FREDERICK A. STEVENS, citizen of the United States, residing at Providence, in the county of Providence and State of Rhode Island, have invented certain new and useful Improvements in Ophthalmic Mountings, of which the following is a specification.

My invention relates to ophthalmic mountings and has for its essential objects the prevention of accidental rotation or axial derangement of the lens without notching or renotching, and thereby weakening, the lens; to permit axial adjustment of the lens for correcting astigmatic defects of vision and thereupon relocking the same; to enable a lens to be applied to a non-metallic rim without stretching the latter whereby distortion and defacement of the rim by the heat is avoided; and to permit the insertion of a lens into a non-split metallic rim thereby avoiding the use of clamping screws.

To the above and other unenumerated and obvious ends my invention consists in such parts and combinations of parts as fall within the scope of the appended claims.

In the accompanying drawings which form a part of this specification, and in which the invention is shown embodied in spectacles and eyeglasses—

Figure 1:
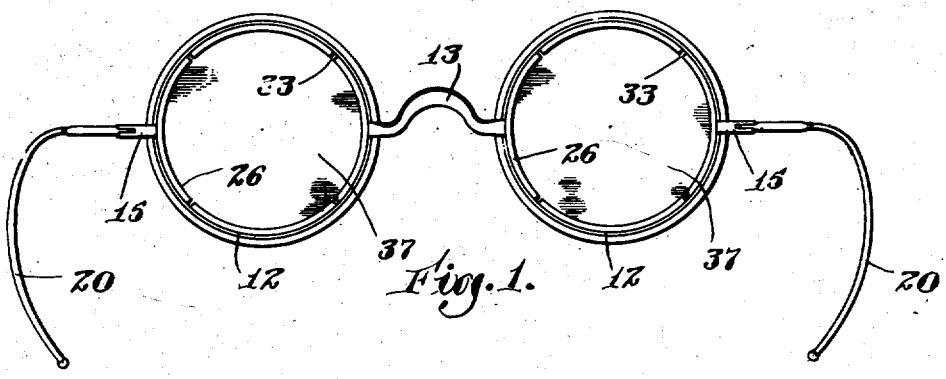
Figure 2:
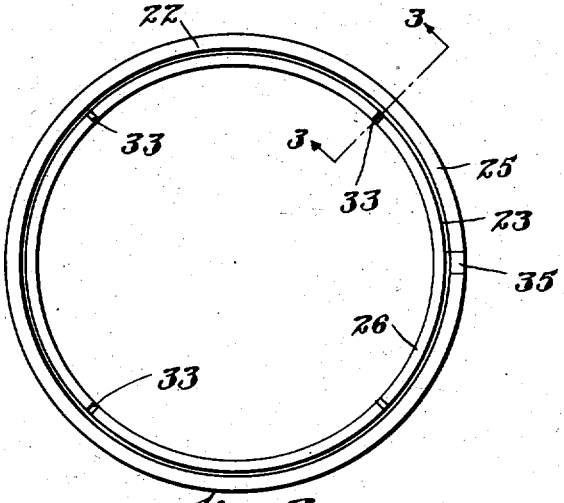
Figure 3:
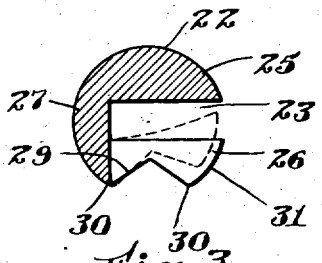
Figure 5:
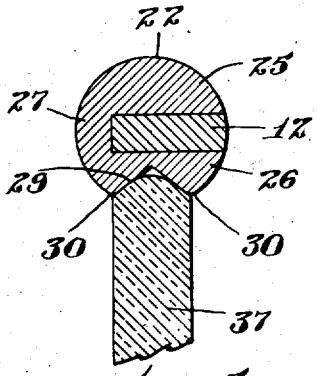
Figure 4:
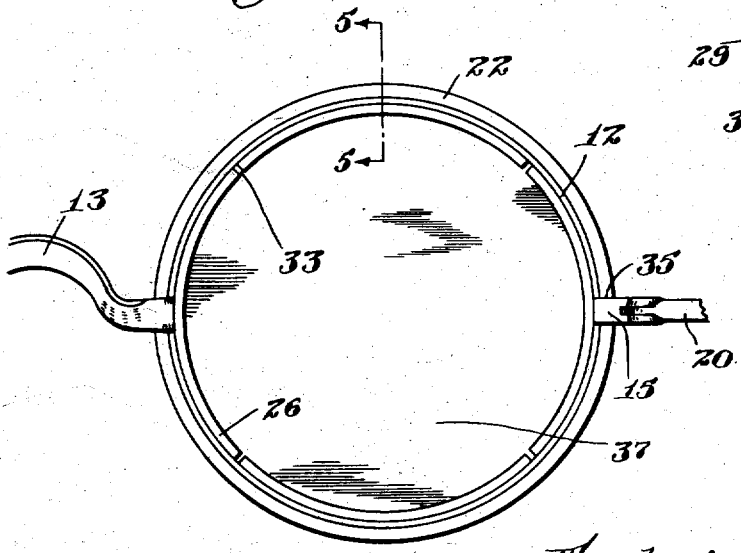

Figure 1 is a rear elevation of a complete pair of spectacles,

Figure 2, an enlarged rear elevation of a single detached rim,

Figure 3, a section of the same on line 3—3 of Fig. 2,

Figure 4, an enlarged rear elevation of an auxiliary rim engaged with a metal rim, showing fragmentary adjacent portions of the spectacle frame, Figure 5, a section on line 5—5 of Fig. 4.

Figure 6:
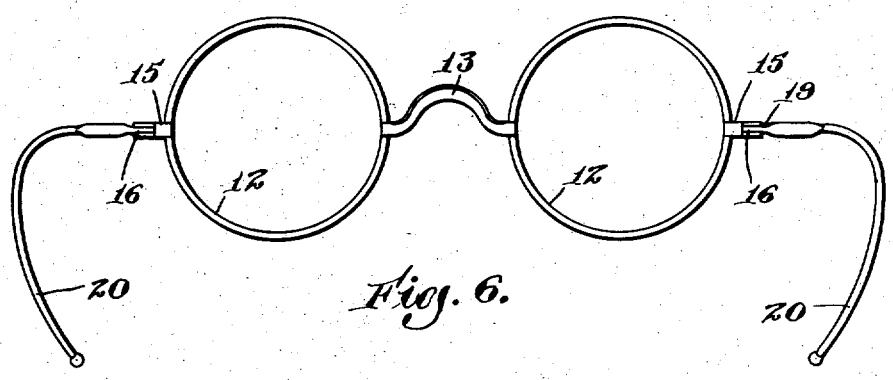
Figure 7:
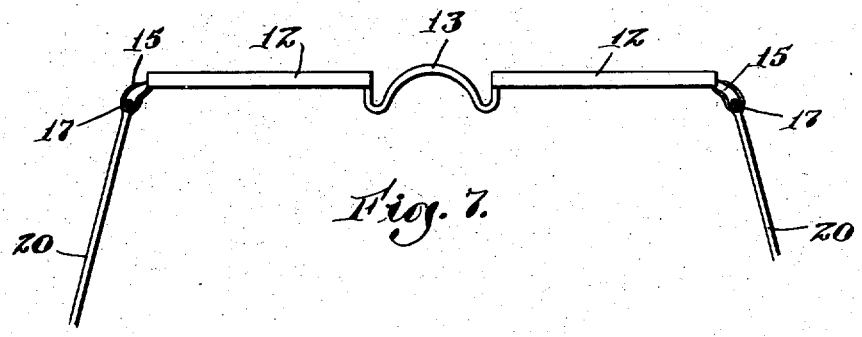
Figure 8:
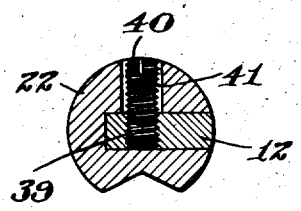
Figure 9:
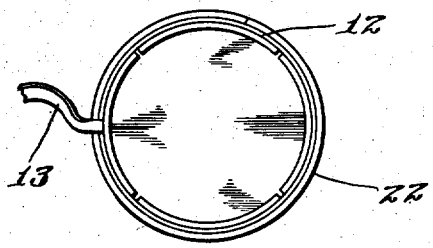

Figures 6 and 7, an elevation and plan respectively of the detached spectacle frame, Figure 8, a section corresponding to that of Fig. 5, showing a modification, and Figure 9, a rear elevation of a portion of an eyeglass embodying my invention.

Like reference characters indicate like parts throughout the views.

In the construction illustrated 12 are endless or non-split rings or metal rims, composed in the present instance of flat material, so that the circular members are of cylindrical form. These members are connected by a bridge 13 fixed to adjacent portions of the rims. In the construction of spectacles, as shown in Fig. 7, non-split end pieces or blocks 15 are fixed to the portions of the rims 12 at points opposite the bridge. The blocks 15 have slots 16 in which are pivoted on pins 17 the flattened end portions 19 of temples 20. In eyeglasses, as shown in Fig. 9, the blocks and temples are obviously omitted.

Applied to the members 12 are auxiliary rims 22, one of which is shown in Figs. 2 and 3. Such rim is preferably, but not necessarily, of non-metallic material common in this art such as celluloid or xylonite. This is provided in its rear side with a rectangular deep annular slot 23 extending transversely of the rim a major portion of its thickness, forming annular outer and inner wing members 25 and 26 respectively. The latter member constitutes an annular tongue connected to its parallel member 25, at its front portion, by a neck portion 27.

The bottom of the tongue is provided with an annular groove 29, V shaped in cross section in the present instance, forming resultant annular shoulders 30, also substantially V shaped in cross section, although the face 31 of the tongue 26 is in this case more strictly speaking transversely curved. The rim 26 is transversely cut or slotted at any desired number of points. In the case illustrated four of these slots 33 are shown. These slots divide the annular tongue 26 into one or more independent tongues according to the number of slots. These segmental tongues have a degree of resiliency dependent upon the material of the constituent rim. If necessary the rear portion of the member 25 may be provided with a notch 35.

The lens 37 is of slightly greater diameter than the shoulders 30 on the tongues 26, and in this instance the lens periphery is shown V shaped or rounded in cross section. The lens is inserted into its seat 29 by pressing the lens against the face 31 of the member 26. In passing the shoulder 30 the lens raises the members into the position of the broken lines shown in Fig. 3, and as soon as the lens reaches its seat 29 the member snaps back into its original position shown in full lines.

An auxiliary rim 22 is applied to a rim 12 by pressing the latter into the channel 23, after the lens has been inserted as described. This locks the lens into its seat in the tongues. The auxiliary rim is held in engagement with the metal rim by friction. It is sometimes convenient, but not essential, to supplement the frictional engagement of the members 12 and 22 as follows. The ring 12, as shown in Fig. 8, is provided with a threaded perforation 39 to receive a screw 40 passing through an opening 41 in the member 22.

When applying the members 22 to an eyeglass frame such as shown in Figs. 6 and 7 the notch 35 is sometimes convenient to receive the end piece 15. In applying the members 22 to an eyeglass frame, as shown in Fig. 9, on which there is no end piece the use of a notch is superfluous.

Other modes of applying the principle of my invention may be employed instead of the one explained provided the means stated by any of the following claims or the equivalent of such stated means be employed.

I claim:

1. In an ophthalmic mounting, the combination of an auxiliary rim provided on its rear side with an annular slot to form a sheath for the main rim, and provided with an annular groove below the slot, an endless main rim in the slot, and a lens seated in the groove.

2. In an ophthalmic mounting, the combination of an auxiliary rim comprising an endless outer peripheral portion, and an inner resilient tongue portion provided with a longitudinally curved groove, a lens in the groove, and an endless rim between the peripheral portion and the tongue portion.

3. In an ophthalmic mounting, the combination of an endless non-metallic rim provided in its rear side with an annular slot extending transversely of the rim a major portion of its thickness forming an endless peripheral portion and an inner tongue portion, said tongue portion being provided with an annular groove below the slot, an endless rim seated in the slot, and a lens seated in the groove.

4. In an ophthalmic mounting, the combination of an auxiliary rim, comprising an outer peripheral portion, and a curved inner tongue portion, said tongue portion being provided with a longitudinally disposed groove upon its inner portion, and with transversely disposed radially arranged slots, an endless rim embraced by both the peripheral portion and the tongue portion, and a lens in the groove.

5. In an ophthalmic mounting, the combination of an auxiliary non-metallic endless rim comprising an outer peripheral portion, and a resilient inner tongue portion provided in its inner periphery with a groove, and with an annular lateral slot between the peripheral portion and the tongue portion, and a lens in the groove.

In testimony whereof I have affixed my signature.

FREDERICK A. STEVENS.